(12) United States Patent
Kato et al.

(10) Patent No.: US 8,252,860 B2
(45) Date of Patent: Aug. 28, 2012

(54) POLYVINYL CHLORIDE RESIN COMPOSITION AND MANUFACTURING METHOD THEREOF

(75) Inventors: Masaki Kato, Tainai (JP); Akira Tsuboi, Kurashiki (JP); Masato Nakamae, Kurashiki (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 0 days.

(21) Appl. No.: 12/999,346

(22) PCT Filed: Jun. 15, 2009

(86) PCT No.: PCT/JP2009/060894
§ 371 (c)(1),
(2), (4) Date: Dec. 16, 2010

(87) PCT Pub. No.: WO2009/154178
PCT Pub. Date: Dec. 23, 2009

(65) Prior Publication Data
US 2011/0086964 A1    Apr. 14, 2011

(30) Foreign Application Priority Data
Jun. 16, 2008 (JP) ................................. 2008-156197

(51) Int. Cl.
*C08K 5/00* (2006.01)
*C08K 5/103* (2006.01)
(52) U.S. Cl. ...................................... 524/399; 524/317
(58) Field of Classification Search .................... 524/399
See application file for complete search history.

(56) References Cited

U.S. PATENT DOCUMENTS

| | | | |
|---|---|---|---|
| 4,963,608 A | 10/1990 | Kunieda et al. | |
| 6,635,709 B2 | 10/2003 | Kato et al. | |
| 6,806,305 B2 | 10/2004 | Kato et al. | |
| 7,070,731 B2 | 7/2006 | Kato et al. | |
| 2006/0180956 A1 | 8/2006 | Kato et al. | |
| 2009/0111940 A1 | 4/2009 | Kato et al. | |
| 2010/0041828 A1 | 2/2010 | Kato et al. | |
| 2010/0324198 A1 | 12/2010 | Nii et al. | |

FOREIGN PATENT DOCUMENTS

| | | |
|---|---|---|
| JP | 50 024531 | 3/1975 |
| JP | 50 92947 | 7/1975 |
| JP | 54 81359 | 6/1979 |
| JP | 57 147552 | 9/1982 |
| JP | 60 238345 | 11/1985 |
| JP | 1 178543 | 7/1989 |
| JP | 6 287387 | 10/1994 |
| JP | 09 003286 | 1/1997 |
| JP | 09 031281 | 2/1997 |
| JP | 09031281 A * | 2/1997 |
| JP | 09 201921 | 8/1997 |

OTHER PUBLICATIONS

Translation of JP 09031281, Feb. 1997.*
Lee et al., Journal of Materials Science Letters, 22, 1291-1293, 2003.*
U.S. Appl. No. 13/142,001, filed Jun. 24, 2011, Nakamae, et al.
U.S. Appl. No. 13/123,386, filed Apr. 8, 2011, Kato, et al.
Iida, T., et al., "Synergetic Effects of Poly(vinyl alcohol)s with Synergetic Metal Soap on the Stabilization of Poly(vinyl chloride)," Japanese Journal of Polymer Science and Technology, vol. 47, No. 3, pp. 197-205, (Mar. 1990) (with English Abstract and partial English translation).
Iida, T., et al., "Synergetic Effects of Saponificated Poly(vinyl acetate)s with Synergetic Metal Soap on the Stabilization of Poly(vinyl chloride)," Japanese Journal of Polymer Science and Technology, vol. 47, No. 6, pp. 509-516, (Jun. 1990) (with English Abstract and partial English translation).
Iida, T., et al., "Synergetic Effects of Ethylene-Vinyl Alcohol Copolymers with Synergetic Metal Soap on the Stabilization of Poly-(vinyl chloride)," Japanese Journal of Polymer Science and Technology, vol. 50, No. 2, pp. 65-72, (Feb. 1993) (with English Abstract and partial English translation).
Ikeda, H., et al., "Dispersibility of Macromolecular Polyols as Co-Stabilizer in Poly(vinyl Chloride) and their Stabilization Effect Combined with Synergetic Metal Soap," Polymers & Polymer Composites, vol. 11, No. 8, pp. 649-662, (2003).
Nakamura, Y., et al., "Morphology and Mechanical Properties of PVC/PVA Blend," Journal of the Adhesion Society of Japan, vol. 43, No. 2, pp. 43-49, (2007) (with English Abstract and partial English translation).
International Search Report issued Sep. 1, 2009 in PCT/JP09/060894 filed Jun. 15, 2009.
U.S. Appl. No. 12/999,020, filed Dec. 14, 2010, Kato, et al.
U.S. Appl. No. 12/999,147, filed Dec. 15, 2010, Kato, et al.
U.S. Appl. No. 12/999,167, filed Dec. 15, 2010, Kato, et al.

* cited by examiner

*Primary Examiner* — Hui Chin
(74) *Attorney, Agent, or Firm* — Oblon, Spivak, McClelland, Maier & Neustadt, L.L.P.

(57) ABSTRACT

A polyvinyl chloride resin composition contains: from 0.005 to 5 parts by weight of a vinyl alcohol-based polymer having a degree of saponification of from 75 to 99.9 mol % and having a viscosity average degree of polymerization of 450 or less; and from 0.01 to 5 parts by weight of a zinc compound, based on 100 parts by weight of a polyvinyl chloride resin. A polyvinyl chloride resin composition is thereby provided that is excellent in thermal stability while being shaped and with which a less colored shaped article can be obtained.

18 Claims, No Drawings

POLYVINYL CHLORIDE RESIN COMPOSITION AND MANUFACTURING METHOD THEREOF

CROSS-REFERENCE TO RELATED APPLICATIONS

This application is a US National Stage Application of PCT/JP2009/060894, filed on Jun. 15, 2009, the text of which is incorporated by reference, and claims priority to Japanese Patent Application 2008-156197, filed on Jun. 16, 2008, the text of which is also incorporated by reference.

TECHNICAL FIELD

The present invention relates to a polyvinyl chloride resin composition preferably used in applications for foods, medical use, household goods, and the like, and to describe further, relates to a polyvinyl chloride resin composition that is good in thermal stability and is less colored.

BACKGROUND ART

Polyvinyl chloride resins are processed for shaping by blending a stabilizer of calcium-zinc base, barium-zinc base, or the like therein, and shaped articles thereof are widely used as products suitable for general use and further for foods, medical use, and the like.

However, since these stabilizers have abilities insufficient to inhibit heat deterioration of the polyvinyl chloride resins, they used to have disadvantages, such as impairing initial colorability of the shaped articles and having insufficient thermal stability while being shaped. Therefore, as a means for improvement of these disadvantages, polyvinyl chloride resin compositions are proposed to which an antioxidant is added or a compound having a hydroxyl group is added.

Patent Document 1 (JP 50-92947A) discloses a method of adding calcium soap, zinc soap, polyol or a derivative thereof, and a neutral inorganic calcium salt to a chloride-containing resin.

Patent Document 2 (JP 54-81359A) discloses a method of adding a water soluble polymer to a chloride-containing polymer.

Patent Document 3 (JP 57-147552A) discloses a method of adding a condensation reaction product of dipentaerythritol and dicarboxylic acid, zinc oxide, zinc carbonate or fatty acid zinc, and hydrotalcite to a chloride-containing resin.

Patent Document 4 (JP 60-238345A) discloses a method of adding a saponified product of an ethylene-vinyl acetate copolymer, having an ethylene unit content of from 20 to 50% and having a degree of saponification of a vinyl acetate unit of 96% or more, and a hydrotalcite-based compound to a thermoplastic resin.

Patent Document 5 (JP 1-178543A) discloses a method of adding metal soap and a saponified product of an ethylene-vinyl acetate copolymer having a copolymer composition that has an ethylene content of from 20 to 75 mol % and has a degree of saponification of a vinyl acetate portion of 50 mol % or more to a halogen-containing thermoplastic resin.

Patent Document 6 (JP 6-287387A) discloses a method of adding a metal salt of an organic acid and acetalized polyvinyl alcohol to a vinyl chloride-based resin.

Patent Document 7 (JP 9-3286A) discloses a method of adding partially saponified polyvinyl alcohol having a degree of saponification of from 70 to 95 mol %, having an average degree of polymerization of from 300 to 2000, and having a terminal mercapto group to a vinyl chloride-based resin.

Patent Document 8 (JP 9-31281A) discloses a method of adding a zinc compound, hydrotalcites, polyvinyl alcohol, and polymethyl methacrylate to a vinyl chloride-based resin.

Non-Patent Document 1 (Japanese Journal of Polymer Science and Technology Vol. 47, No. 3, 197 (1990)) discloses a method of adding zinc stearate-calcium stearate complex soap and completely saponified polyvinyl alcohol having a degree of polymerization of 600 or more to polyvinyl chloride.

Non-Patent Document 2 (Japanese Journal of Polymer Science and Technology Vol. 47, No. 6, 509 (1990)) discloses a method of adding zinc stearate-calcium stearate complex soap and partially saponified polyvinyl alcohol having a degree of polymerization of 500 and having a degree of saponification of 73.6 mol % to polyvinyl chloride.

Non-Patent Document 3 (Japanese Journal of Polymer Science and Technology Vol. 50, No. 2, 65 (1993)) discloses a method of adding zinc stearate-calcium stearate complex soap and an ethylene-vinyl alcohol copolymer having an ethylene content of 29 mol % or more to polyvinyl chloride.

Non-Patent Document 4 (Polymers & Polymer Composites, Vol. 11, 649 (2003)) discloses a method of adding zinc stearate-calcium stearate complex soap, and polyvinyl alcohol having a degree of polymerization of 500 and having a degree of saponification of 98.5 mol % or an ethylene-vinyl alcohol copolymer having an ethylene content of 29 mol % or more to polyvinyl chloride.

Non-Patent Document 5 (Journal of the Adhesion Society of Japan Vol. 43, No. 2, 43 (2007)) discloses a method of adding polyvinyl alcohol having a degree of polymerization of 500 and having a degree of saponification of 88 mol % or polyvinyl alcohol having a degree of polymerization of 1700 and having a degree of saponification of 78 mol % or more, and polymethyl methacrylate to polyvinyl chloride.

However, the polyvinyl chloride resin compositions described in Patent Documents 1 through 8 and Non-Patent Documents 1 through 5 have problems of not being sufficient in the long term thermal stability and of being colored.

PRIOR ART DOCUMENTS

Patent Documents

Patent Document 1: JP 50-92947A
Patent Document 2: JP 54-81359A
Patent Document 3: JP 57-147552A
Patent Document 4: JP 60-238345A
Patent Document 5: JP 1-178543A
Patent Document 6: JP 6-287387A
Patent Document 7: JP 9-3286A
Patent Document 8: JP 9-31281A

Non-Patent Documents

Non-Patent Document 1: Japanese Journal of Polymer Science and Technology Vol. 47, No. 3, 197 (1990)

Non-Patent Document 2: Japanese Journal of Polymer Science and Technology Vol. 47, No. 6, 509 (1990)

Non-Patent Document 3: Japanese Journal of Polymer Science and Technology Vol. 50, No. 2, 65 (1993)

Non-Patent Document 4: Polymers & Polymer Composites, Vol. 11, 649 (2003)

Non-Patent Document 5: Journal of the Adhesion Society of Japan Vol. 43, No. 2, 43 (2007)

SUMMARY OF THE INVENTION

Problem to be Solved by the Invention

It is an object of the present invention to provide a vinyl chloride resin composition that is excellent in thermal stability while being shaped and with which a less colored shaped article can be obtained.

Means for Solving the Problems

As a result of intensive studies, the present inventors have found that it is possible to keep sufficient thermal stability while being shaped and also make a less colored shaped article thereof by blending a specific amount of a vinyl alcohol-based polymer (hereinafter, may be abbreviated as PVA) having a degree of saponification of from 75 to 99.9 mol % and having a viscosity average degree of polymerization of 450 or less to a polyvinyl chloride resin in a case of adding a stabilizer of a zinc compound to the polyvinyl chloride resin composition, and thus have come to complete the present invention.

That is, the problem is solved by providing a polyvinyl chloride resin composition comprising: from 0.005 to 5 parts by weight of a vinyl alcohol-based polymer having a degree of saponification of from 75 to 99.9 mol % and having a viscosity average degree of polymerization of 450 or less; and from 0.01 to 5 parts by weight of a zinc compound, based on 100 parts by weight of a polyvinyl chloride resin.

At this time, it is preferred that the vinyl alcohol-based polymer and the zinc compound are contained therein by adding them to the polyvinyl chloride resin. It is also preferred that the vinyl alcohol-based polymer is obtained by homopolymerizing a vinyl ester-based monomer.

It is also preferred to further comprise from 0.001 to 10 parts by weight of a lubricant based on 100 parts by weight of the polyvinyl chloride resin. At this time, it is preferred that the lubricant is a fatty acid ester of polyol, and particularly preferred that it is glycerin monostearate.

Further, the problem is also solved by providing a method of producing a polyvinyl chloride resin composition, comprising adding: from 0.005 to 5 parts by weight of a vinyl alcohol-based polymer having a degree of saponification of from 75 to 99.9 mol % and having a viscosity average degree of polymerization of 450 or less; and from 0.01 to 5 parts by weight of a zinc compound, based on 100 parts by weight of a polyvinyl chloride resin to the polyvinyl chloride resin. At this time, it is preferred to further comprise adding from 0.001 to 10 parts by weight of a lubricant based on 100 parts by weight of the polyvinyl chloride resin.

Effects of the Invention

In a case of using the resin composition of the present invention, it is possible to achieve effects of being excellent in thermal stability while being shaped and of enabling to obtain a less colored shaped article.

MODE FOR CARRYING OUT THE INVENTION

As a material to produce a polyvinyl chloride resin used for the present invention, as well as a vinyl chloride monomer, a mixture having a vinyl chloride monomer as a main component and a monomer that is copolymerizable therewith (50 weight % or more of the vinyl chloride monomer) is used. The monomer copolymerized with the vinyl chloride monomer may include vinyl esters, such as vinyl acetate and vinyl propionate, acrylic esters or methacrylic esters, such as methyl acrylate and ethyl acrylate, olefins, such as ethylene and propylene, maleic anhydride, acrylonitrile, styrene, vinylidene chloride, and the like.

As a method of producing the polyvinyl chloride resin using these monomers, it is possible to preferably employ a method of suspension polymerizing the monomer in the presence of polymerization initiator. In such a case, a normally used dispersion stabilizer is used that is, for example, a water soluble polymer, such as a water soluble cellulose ether, like methylcellulose, hydroxyethyl cellulose, hydroxypropyl cellulose, hydroxypropyl methylcellulose, and the like, polyvinyl alcohol, and gelatin; an oil soluble emulsifier, such as sorbitan monolaurate, sorbitan trioleate, glycerin tristearate, and an ethylene oxide-propylene oxide block copolymer; a water soluble emulsifier, such as polyoxyethylene sorbitan monolaurate, polyoxyethylene glycerin oleate, and sodium laurate. Among them, polyvinyl alcohol having a degree of saponification of from 65 to 99 mol % and having a degree of polymerization of from 500 to 4000 is preferably used, which is added preferably from 0.01 to 2.0 parts by weight to 100 parts by weight of vinyl chloride. Although the dispersion stabilizer for suspension polymerization may be used singly, a polyvinyl alcohol-based polymer having a degree of polymerization of from 100 to 4000 and having a degree of saponification of from 30 to 99 mol %, which is normally used for suspension polymerizing a vinyl-based compound, such as vinyl chloride, in an aqueous medium, can be used and it is preferred to be from 0.01 to 2.0 parts by weight to 100 parts by weight of a vinyl-based compound, such as vinyl chloride although the amount thereof to be added is not particularly limited.

As the initiator used for polymerization, an oil soluble or water soluble polymerization initiator can be used that has been used for polymerization of a vinyl chloride monomer or the like conventionally. The oil soluble polymerization initiator may include, for example, percarbonate compounds, such as diisopropyl peroxydicarbonate, di-2-ethylhexyl peroxydicarbonate, and diethoxyethyl peroxydicarbonate; perester compounds, such as t-butyl peroxyneodecanoate, t-butyl peroxypivalate, t-hexyl peroxypivalate, and α-cumyl peroxyneodecanoate; peroxides, such as acetyl cyclohexyl sulfonyl peroxide, 2,4,4-trimethylpentyl-2-peroxyphenoxyacetate, 3,5,5-trimethyl hexanoyl peroxide, and lauroyl peroxide; azo compounds, such as azobis-2,4-dimethylvaleronitrile and azobis(4-2,4-dimethylvaleronitrile), and the like. The water soluble polymerization initiator may include, for example, potassium persulfate, ammonium persulfate, hydrogen peroxide, cumene hydroperoxide, and the like. These oil soluble or water soluble polymerization initiators can be used singly or in combination of two or more types.

Upon polymerization, it is possible to add various other additives to the polymerization reaction system as needed. The additives may include, for example, polymerization regulators, such as aldehydes, halogenated hydrocarbons, and mercaptans, polymerization inhibitors, such as a phenol compound, a sulfur compound, and an N-oxide compound, and the like. In addition, it is also possible to arbitrarily add a pH adjuster, a crosslinker, and the like.

Upon polymerization, the polymerization temperature is not particularly limited and it can also be adjusted to a low temperature at approximately 20° C. as well as a high temperature at over 90° C. It is also one of preferred embodiments to use a polymerization vessel with a reflux condenser to enhance the heat removal efficiency of the polymerization reaction system.

For the polymerization, it is possible to arbitrarily add additives, such as antiseptics, mildewcides, antiblocking agents, defoamers, antifouling agents, and antistatics, that are normally used for polymerization as needed.

The PVA contained in the polyvinyl chloride resin composition of the present invention can be contained therein by, for example, being added to the polyvinyl chloride resin after polymerizing to obtain a polyvinyl chloride resin. The PVA can be added in powder or by being dissolved in water or an organic solvent to the polyvinyl chloride resin. As the PVA is added when polymerizing to obtain the polyvinyl chloride resin, the PVA acts as a dispersant for the polyvinyl chloride resin, so that it may affect the quality of the polyvinyl chloride resin thus obtained, such as the average particle diameter and the plasticizer absorbency.

The PVA added to the polyvinyl chloride resin has a degree of saponification of from 75 to 99.9 mol %, preferably from 78 to 98.5 mol %, and particularly preferably from 80 to 96 mol %. In a case of the degree of saponification of less than 75 mol %, the long term thermal stability decreases and thus it is not preferred. The degree of saponification of the PVA is a value measured in accordance with JIS K6726.

The PVA has a viscosity average degree of polymerization (hereinafter, may be referred to simply as a degree of polymerization) of 450 or less, preferably 430 or less, and particularly preferably 410 or less. Although a lower limit of the viscosity average degree of polymerization is not particularly limited, the viscosity average degree of polymerization is preferably 50 or more and more preferably 100 or more from the perspective of production of the PVA. When the viscosity average degree of polymerization is more than 450, the long term thermal stability seriously decreases and thus it is not preferred. The viscosity average degree of polymerization of the PVA is a value measured in accordance with JIS K6726. That is, it can be obtained by the following expression using limiting viscosity [η] that is measured in water at 30° C. after resaponifying the PVA to a degree of saponification of 99.5 mol % or more and purifying it.

$$P=([\eta] \times 1000/8.29)^{(1/0.62)}$$

In the present invention, the PVA may be used singly or may also be used by mixing two or more types having different properties.

The PVA can be produced by polymerizing a vinyl ester-based monomer by employing a conventionally known process, such as bulk polymerization, solution polymerization, suspension polymerization, emulsion polymerization, and dispersion polymerization, and saponifying the vinyl ester-based polymer thus obtained. Polymerization processes preferred from the industrial perspective are solution polymerization, emulsion polymerization, and dispersion polymerization. For the polymerization operation, any polymerization system can be employed among batch process, semi-batch process, and continuous process.

The vinyl ester-based monomer allowed to be used for the polymerization may include, for example, vinyl acetate, vinyl formate, vinyl propionate, vinyl caprylate, vinyl versatate, and the like, and among them, vinyl acetate is preferred from the industrial perspective.

Upon the polymerization of the vinyl ester-based monomer, although it is allowed to copolymerize the vinyl ester-based monomer with another monomer as long as not impairing the spirit of the present invention, it is preferred to homopolymerize the vinyl ester-based monomer.

Upon the polymerization of the vinyl ester-based monomer, for the purpose of adjustment of the degree of polymerization of the PVA thus obtained or the like, a chain transfer agent is allowed to coexist. The chain transfer agent may include aldehydes, such as acetaldehyde, propionaldehyde, butylaldehyde, and benzaldehyde; ketones, such as acetone, methyl ethyl ketone, hexanone, and cyclohexanone; mercaptans, such as 2-hydroxy ethanethiol; thiocarboxylic acids, such as thioacetic acid; and halogenated hydrocarbons, such as trichloroethylene and perchloroethylene, and among all, aldehydes and ketones are used preferably. Although the amount of the chain transfer agent to be added is determined according to the chain transfer constant of the chain transfer agent to be added and the intended degree of polymerization of the PVA, it is generally desired to be from 0.1 to 10 weight % to the PVA. Here, when using thiocarboxylic acids or the like as the chain transfer agent, a functional group derived from the chain transfer agent is introduced into a terminal of the vinyl ester-based polymer and a PVA is sometimes obtained that has a terminal SH group by saponification. However, as also shown in Examples below, in a case of using such PVA, the effect of improvement in the thermal stability of the polyvinyl chloride resin composition thus obtained is not so large. Consequently, it is desired not to use thiocarboxylic acids as the chain transfer agent. In addition, it is preferred that the PVA does not have an SH group at a terminal thereof.

In the present invention, it is also possible to use a PVA having a high content of 1,2-glycol bond that is obtained by polymerizing the vinyl ester-based monomer at a temperature condition higher than normal polymerization. In this case, the content of 1,2-glycol bond is preferably 1.9 mol % or more, more preferably 2.0 mol % or more, and even more preferably 2.1 mol % or more.

To the saponification reaction of the vinyl ester-based polymer, an alcoholysis or hydrolysis reaction can be applied using conventionally known basic catalysts, such as sodium hydroxide, potassium hydroxide, and sodium methoxide, or acid catalysts, such as p-toluenesulfonic acid. The solvent used for the saponification reaction may include alcohols, such as methanol and ethanol; esters, such as methyl acetate and ethyl acetate; ketones, such as acetone and methyl ethyl ketone; and aromatic hydrocarbons, such as benzene and toluene, and they can be used singly or in combination of two or more types. Among all, it is preferred for the convenience to carry out a saponification reaction using a methanol or mixed solution of methanol and methyl acetate as the solvent in the presence of sodium hydroxide as the basic catalyst.

The PVA contained in the polyvinyl chloride resin composition is from 0.005 to 5 parts by weight based on 100 parts by weight of the polyvinyl chloride resin, and preferably from 0.04 to 3 parts by weight. The long term thermal stability is insufficient in a case of less than 0.005 parts by weight, and in a case of exceeding 5 parts by weight, the polyvinyl chloride resin is colored and it is not preferred.

In a case of adding the PVA used for the present invention when polymerizing to obtain the polyvinyl chloride resin, most of the PVA is removed by washing of the polyvinyl chloride resin after producing the resin, so that the content of the PVA in the polyvinyl chloride resin composition becomes less than 0.005 parts by weight and thus the effect as a thermostabilization aid is not obtained.

In the present invention, the PVA may also contain an acid having pKa at 25° C. of from 3.5 to 5.5 and/or a metal salt thereof. The type of the acid is not particularly limited, and the specific examples may include acetic acid (pKa of 4.76), propionic acid (pKa of 4.87), butyric acid (pKa of 4.63), octanoic acid (pKa of 4.89), adipic acid (pKa of 5.03), benzoic acid (pKa of 4.00), formic acid (pKa of 3.55), valeric acid (pKa of 4.63), heptanoic acid (pKa of 4.66), lactic acid (pKa of 3.66), phenylacetic acid (pKa of 4.10), isobutyric acid (pKa of 4.63), cyclohexanecarboxylic acid (pKa of 4.70), and the like. Particularly preferably used acids are acetic acid, propionic acid, and lactic acid. It is also possible to use metal salts of the acids above. Although the type of the metal salt is not particularly limited, a salt of alkali metal, such as sodium, potassium, magnesium, or calcium, is normally used.

The acid having pKa of from 3.5 to 5.5 and/or a metal salt thereof is preferably contained at a ratio of from 0.05 to 5 parts by weight based on 100 parts by weight of the PVA, more preferably from 0.1 to 3 parts by weight, and even more preferably from 0.15 to 2 parts by weight. The long term thermal stability decreases in a case that the acid and/or a metal salt thereof is contained less than 0.05 parts by weight to the PVA, and in a case of exceeding 5 parts by weight, there is a possibility that the polyvinyl chloride resin is colored.

The method of containing the acid and/or a metal salt thereof in a predetermined amount is not particularly specified and may include, for example, a method of adjusting the type, the amount, and the like of the alkali catalyst used for the saponification when producing the PVA, a method of adding or removing the acid and/or a metal salt thereof after producing the PVA.

The zinc compound used in the present invention may include aliphatic carboxylates of zinc, such as zinc stearate, zinc laurate, and zinc oleate, aromatic carboxylic acid zinc, such as zinc benzoate and zinc p-tert butyl benzoate, zinc salts of an organic acid, such as an amino acid zinc salt and a phosphate zinc salt, inorganic zinc salts, such as zinc oxide and zinc carbonate, and the like. The zinc compound is added from 0.01 to 5 parts by weight based on 100 parts by weight of the polyvinyl chloride resin, and preferably from 0.05 to 3 parts by weight. The sufficient thermal stability effect is not obtained in a case of being added in the amount of less than 0.01 parts by weight, and in a case of exceeding 5 parts by weight, a shaped article of the polyvinyl chloride resin composition is blackened and thus it is not preferred. The zinc compound can be contained by adding it to the polyvinyl chloride resin after polymerizing to obtain a polyvinyl chloride resin.

Together with the polyvinyl chloride resin composition of the present invention, it is possible to use stabilizers, phenolic antioxidants, phosphorous antioxidants, light stabilizers, ultraviolet absorbers, antifog agents, antistatics, flame retardants, lubricants, modifiers, reinforcements, pigments, blowing agents, plasticizers, and the like that are normally used. To the polyvinyl chloride resin composition of the present invention, another resin may also be mixed as long as not impairing the mechanical properties.

The lubricants may include hydrocarbons, such as liquid paraffin, natural paraffin, micro wax, and polyethylene wax; fatty acids, such as stearic acid and lauric acid; fatty acid amides, such as stearic amide, palmitic amide, methylenebisstearoamide, and ethylenebisstearoamide; fatty acid esters of monoalcohol, such as butyl stearate; fatty acid esters of polyol, such as hydrogenated caster oil, ethylene glycol monostearate, glycerin monostearate, and triethylene glycol di-2-ethyl hexanoate; alcohols, such as cetyl alcohol and stearyl alcohol. Among all, in a case of using a fatty acid ester of polyol, the effect of the present invention is exhibited even more. At this time, it is preferred to be a fatty acid monoester of polyol and also preferred to be a fatty acid ester of glycerin. In addition, the fatty acid of the fatty acid ester preferably has a carbon number of from 8 to 22 and is even more preferably a stearic acid ester. Among them, glycerin monostearate is particularly preferred. The lubricant is added preferably from 0.001 to 10 parts by weight based on 100 parts by weight of the polyvinyl chloride resin, and even more preferably from 0.05 to 5 parts by weight.

As the stabilizer, well known ones can be used and they may specifically include organic metal salts, such as soap of alkaline earth metals, like calcium soap and barium soap, aluminum soap, and organic phosphoric acid metal salts; inorganic metal salts, such as metal oxide, metal hydroxide, metal carbonate, and inorganic complex metal salts, like zeolite; halogen oxy acid salts, such as barium chlorate, barium perchlorate, and sodium perchlorate; and non-metallic stabilizers, such as β-diketone, polyol, and epoxy compounds.

The plasticizer may include, for example, ester-based plasticizers, such as an ester of an acid, like phthalic acid, trimellitic acid, pyromellitic acid, adipic acid, sebacic acid, and azelaic acid, and a single linear or branched alkyl alcohol, or a mixture thereof, like n-propanol, isopropanol, n-butanol, isobutanol, tert-butanol, n-pentanol, isopentanol, tert-pentanol, n-hexanol, isohexanol, n-heptanol, isoheptanol, n-octanol, isooctanol, 2-ethylhexanol, n-nonanol, isononanol, n-decanol, isodecanol, lauryl alcohol, myristyl alcohol, palmityl alcohol, and stearyl alcohol, and an ester of butanediol and adipic acid; epoxy-based plasticizers, such as epoxidized soybean oil, epoxidized linseed oil, epoxidized castor oil, epoxidized linseed oil fatty acid butyl, octyl epoxy stearate, epoxy triglyceride, diisodecyl epoxy-hexahydrophthalate, or a low molecular weight reaction product resin of bisphenol A with epichlorohydrin; and phosphate-based plasticizers, such as tricresyl phosphate, trixylenyl phosphate, monobutyl dixylenyl phosphate, and trioctyl phosphate.

The phenolic antioxidant may be any of those used normally, and may include, for example, 2,6-ditertiary butyl-p-cresol, 2,6-diphenyl-4-octadecyloxyphenol, stearyl(3,5-ditertiary butyl-4-hydroxyphenyl)-propionate, distearyl(3,5-ditertiary butyl-4-hydroxybenzyl)phosphonate, thiodiethylene glycol bis[(3,5-ditertiary butyl-4-hydroxyphenyl)propionate], 1,6-hexamethylene bis[(3,5-ditertiary butyl-4-hydroxyphenyl)propionate], 1,6-hexamethylene bis[(3,5-ditertiary butyl-4-hydroxyphenyl)propionic acid amide], 4,4'-thiobis(6-tertiary butyl-m-cresol), 2,2'-methylene bis(4-methyl-6-tertiary butylphenol), 2,2'-methylene bis (4-ethyl-6-tertiary butylphenol), bis[3,3-bis(4-hydroxy-3-tertiary butylphenyl)butyric acid]glycol ester, 2,2'-ethylidene bis(4,6-ditertiary butylphenol), 2,2' ethylidene bis(4-secondary butyl-6-tertiary butylphenol), 1,1,3-tris(2-methyl-4-hydroxy-5-tertiary butylphenyl)butane, bis[2-tertiary butyl-4-methyl-6-(2-hydroxy-3-tertiary butyl-5-methylbenzyl) phenyl]terephthalate, 1,3,5-tris(3,5-ditertiary butyl-4-hydroxybenzyl)-2,4,6-trimethylbenzene, 1,3,5-tris[(3,5-ditertiary butyl-4-hydroxyphenyl)propionyloxyethyl] isocyanurate, tetrakis[methylene-3-(3,5-ditertiary butyl-4-hydroxyphenyl)propionate]methane, 2 tertiary butyl-4-methyl-6-(2-acryloyloxy-3-tertiary butyl-5-methylbenzyl) phenol, 3,9-bis[1,1-dimethyl-2-{(3-tertiary butyl-4-hydroxy-5-methylphenyl)propionyloxy}ethyl]-2,4,8,10-tetraoxaspiro[5.5]undecane, and triethylene glycol bis[(3-tertiary butyl-4-hydroxy-5-methylphenyl)propionate]. The phenolic antioxidant is added preferably from 0.01 to 5 parts by weight based on 100 parts by weight of the polyvinyl chloride resin, and even more preferably from 0.1 to 3 parts by weight.

The phosphorous antioxidant may be any of those used normally, and may include, for example, trisnonylphenyl phosphite, tris(2,4-ditertiary butylphenyl)phosphite, tris[2-tertiary butyl-4-(3-tertiary butyl-4-hydroxy-5-methylphenylthio)-5-methylphenyl]phosphite, tridecyl phosphite, octyl diphenyl phosphite, di(decyl) monophenyl phosphite, di(tridecyl)pentaerythritol diphosphite, distearyl pentaerythritol diphosphite, di(nonylphenyl)pentaerythritol diphosphite, bis(2,4-ditertiary butylphenyl)pentaerythritol diphosphite, bis(2,6-ditertiary butyl-4-methylphenyl)pentaerythritol diphosphite, bis(2,4,6-tritertiary butylphenyl)pentaerythritol diphosphite, tetra(tridecyl)isopropylidenediphenol diphosphite, tetra(tridecyl)-4,4'-n-butylidenebis(2-tertiary butyl-5-methylphenol)diphosphite, hexa(tridecyl)-1,1,3-tris(2-methyl-4-hydroxy-5-tertiary butylphenyl)butane triphosphite, tetrakis(2,4-ditertiary butylphenyl)biphenylene diphosphonite, 9,10-dihydro-9-oxa-10-phosphaphenanthrene-10-oxide, and 2,2'-methylenebis(4-methyl-6-tertiary butylphenyl)-2-ethylhexyl phosphite. The phosphorous antioxidant is added preferably from 0.001 to 5 parts by weight based on 100 parts by weight of the polyvinyl chloride resin, and even more preferably from 0.005 to 3 parts by weight.

The ultraviolet absorber may include, for example, 2-hydroxybenzophenones, such as 2,4-dihydroxybenzophenone, 2-hydroxy-4-methoxybenzophenone, 2-hydroxy-4-octoxybenzophenone, and 5,5'-methylenebis(2-hydroxy-4-methoxybenzophenone); 2-(2-hydroxyphenyl) benzotriazoles, such as 2-(2-hydroxy-5-tertiary octylphenyl)benzotriazole, 2-(2-hydroxy-3,5-ditertiary butylphenyl)-5-chlorobenzotriazole, 2-(2-hydroxy-3-tertiary butyl-5-methylphenyl)-5-chlorobenzotriazole, 2-(2-hydroxy-3,5-dicumylphenyl)benzotriazole, 2,2'-methylenebis(4-tertiary octyl-6-benzotriazolyl) phenol, and a polyethylene glycol ester of 2-(2-hydroxy-3-tertiary butyl-5-carboxyphenyl)benzotriazole; benzoates, such as phenyl salicylate resorcinol monobenzoate, 2,4-ditertiary butylphenyl-3,5-ditertiary butyl-4-hydroxybenzoate, and hexadecyl-3,5-ditertiary butyl-4-hydroxybenzoate; substituted oxanilides, such as 2-ethyl-2'-ethoxyoxanilide, and 2-ethoxy-4'-dodecyloxanilide; and cyanoacrylates, such as ethyl-α-cyano-β,β-diphenylacrylate and methyl-2-cyano-3-methyl-3-(p-methoxyphenyl)acrylate. The ultraviolet absorber is added preferably from 0.005 to 10 parts by weight based on 100 parts by weight of the vinyl chloride, and even more preferably from 0.01 to 5 parts by weight.

The light stabilizer may include, for example, hindered amine compounds, such as 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, bis(1,2,2,6,6-pentamethyl-4-piperidyl)sebacate, tetrakis(2,2,6,6-tetramethyl-4-piperidyl)butanetetracarboxylate, tetrakis(1,2,2,6,6-pentamethyl-4-piperidyl)butanetetracarboxylate, bis(1,2,2,6,6-pentamethyl-4-piperidyl)di(tridecyl)-1,2,3,4-butanetetracarboxylate, bis(1,2,2,6,6-pentamethyl-4-hydroxybenzyl)malonate, a 1-(2-hydroxyethyl)-2,2,6,6-tetramethyl-4-piperidinol/diethyl succinate polycondensation product, a 1,6-bis(2,2,6,6-tetraethyl-4-piperidylamino)hexane/dibromoethane polycondensation product, a 1,6-bis(2,2,6,6-tetramethyl-4-piperidylamino)hexane/2,4-dichloro-6-morpholino-s-triazine polycondensation product, a 1,6-bis(2,2,6,6-tetramethyl-4-piperidylamino)hexane/2,4 dichloro-6-tertiary octylamino-s-triazine polycondensation product, 1,5,8,12-tetrakis[2,4-bis(N-butyl-N-(2,2,6,6-tetramethyl-4-piperidyl)amino)-s-triazine-6-yl]-1,5,8,12-tetraazadodecane, 1,6,11-tris[2,4-bis(N-butyl-N-(2,2,6,6-tetramethyl-4-piperidyl)amino)-s-triazine-6-ylamino]undecane, and 1,6,11-tris[2,4-bis(N-butyl-N-(1,2,2,6,6-pentamethyl-4-piperidyl)amino)-s-triazine-6-ylamino]undecane. The light stabilizer is added preferably from 0.001 to 5 parts by weight based on 100 parts by weight of the polyvinyl chloride resin, and even more preferably from 0.05 to 3 parts by weight.

A method of processing the polyvinyl chloride resin composition of the present invention may include extrusion processing, calender processing, blow molding, press processing, powder molding, injection molding, and the like.

EXAMPLES

The present invention is described below by way of Examples further in detail. In Examples and Comparative Examples below, parts and % denote parts by weight and weight %, respectively, unless otherwise specified.

Example 1

(Production of Polyvinyl Chloride Resin)

Polyvinyl alcohol, having a degree of polymerization of 850 and having a degree of saponification of 72 mol %, in an amount equivalent to 600 ppm with respect to vinyl chloride was dissolved in deionized water to prepare a dispersion stabilizer. The dispersion stabilizer thus obtained was charged in a glass-lined autoclave on which an antifouling agent, NOXOL WSW (produced by CIRS) was applied so as to have a solid content of 0.3 g/m$^2$. Subsequently, 0.04 parts of a 70% toluene solution of diisopropyl peroxydicarbonate was charged in the glass-lined autoclave, and after removing oxygen by degassing until the pressure in the autoclave becomes 0.0067 MPa, 30 parts of vinyl chloride was charged therein and the contents in the autoclave were raised in temperature to 57° C. while being stirred to initiate polymerization. The pressure in the autoclave when initializing the polymerization was 0.83 MPa. After seven hours since the initiation of polymerization, the polymerization is terminated at the time of the pressure in the autoclave being 0.44 MPa, and unreacted vinyl chloride was removed, followed by taking the polymerization reaction product out to dry it at 65° C. overnight, and thus a polyvinyl chloride resin (PVC) was obtained.

(Production of PVA)

In a 6 L reaction vessel provided with a stirrer, a nitrogen inlet port, an additive inlet port, and an initiator addition port, 2450 g of vinyl acetate and 1050 g of methanol were charged and were raised in temperature to 60° C., followed by purging inside the system with nitrogen by nitrogen bubbling for 30 minutes. As a chain transfer agent, a 20% concentration solution of 2-mercapto ethanol (hereinafter referred to as 2-ME) dissolved in methanol was prepared and was purged with nitrogen by bubbling with a nitrogen gas. The temperature within the reaction vessel was adjusted to 60° C. and 0.2 g of 2-ME was added thereto, and then 1.2 g of 2,2'-azobis(4-methoxy-2,4-dimethylvaleronitrile) was added to initiate polymerization. The polymerization temperature was maintained at 60° C. during the polymerization, and the 20% methanol solution of 2-ME was continuously added at 5.0 mL/hr. It was cooled after four hours when the polymerization conversion reached 60% to terminate the polymerization. Subsequently, unreacted vinyl acetate was removed under reduced pressure to obtain a methanol solution of polyvinyl acetate (PVAc). A methanol solution of NaOH (10% concentration) was added to a PVAc solution adjusted to 30% so as to make the alkali molar ratio (mole number of NaOH/mole number of vinyl ester unit in PVAc) to become 0.01 for saponification. The PVA thus obtained was washed with methanol. By way of the above operation, a PVA was obtained that has a degree of polymerization of 400 and has a degree of saponification of 93 mol %. The sodium acetate content measured by isotachophoresis was 0.5%.

(Thermal Stability Test)

To 100 parts by weight of the polyvinyl chloride resin, an aqueous PVA solution was added using a 1% concentration aqueous PVA solution to make it an amount shown in Table 1, and was dried at 50° C. for eight hours by a vacuum dryer. To the polyvinyl chloride resin composition, 2 parts by weight of zinc stearate, 1 part by weight of calcium stearate, and 20 parts by weight of dioctyl phthalate were mixed. The polyvinyl chloride resin composition was kneaded at 160° C. for five minutes with a test roll to fabricate a sheet having a thickness of 0.45 mm. The sheet was cut into 50×70 mm. The sheet pieces were put into a gear oven, and the time period until they were completely blackened at a temperature of 180° C. was measured to make it an index of the thermal stability.

(Colorability Test)

The sheet obtained from the test roll was cut into 45×30 mm, and several sheet pieces thus obtained were stacked and pressed at 185° C. for five minutes to fabricate a test piece having a thickness of 5 mm, and the colorability was compared visually and determined in accordance with the following standards.

A: almost not colored
B: slightly colored
C: yellowed
D: yellow-browned

Examples 2 through 7

In the same method as Example 1 other than modifying the weights of the vinyl acetate and methanol charged upon polymerization and modifying the alkali molar ratio for saponification, a PVA shown in Table 1 was obtained. The thermal stability and the colorability were evaluated in the same way as Example 1. The results of evaluation are shown in Table 1.

Example 8

In the same method other than adding sodium acetate, in addition, to 100 parts by weight of the PVA obtained in Example 1 so as to make the sodium acetate content to be 2 parts by weight, a PVA shown in Table 1 was obtained. The thermal stability and the colorability were evaluated in the same way as Example 1. The results of evaluation are shown in Table 1.

Example 9

In the same method other than adding sodium acetate, in addition, to 100 parts by weight of the PVA obtained in Example 1 so as to make the sodium acetate content to be 5 parts by weight, a PVA shown in Table 1 was obtained. The thermal stability and the colorability were evaluated in the same way as Example 1. The results of evaluation are shown in Table 1.

Example 10

(Production of PVA having Terminal SH Group)

In a 6 L reaction vessel provided with a stirrer, a nitrogen inlet port, an additive inlet port, and an initiator addition port, 2450 g of vinyl acetate and 1050 g of methanol were charged and were raised in temperature to 60° C., followed by purging inside the system with nitrogen by nitrogen bubbling for 30 minutes. As a chain transfer agent, a 5% concentration solution of thioacetic acid dissolved in methanol was prepared and was purged with nitrogen by bubbling with a nitrogen gas. The temperature within the reaction vessel was adjusted to 60° C. and 9.6 g of the methanol solution of thioacetic acid prepared in advance was added thereto, and then 2.0 g of 2,2'-azobis(isobutyronitrile) was added to initiate polymerization. The polymerization temperature was maintained at 60° C. during the polymerization, and the 5% methanol solution of thioacetic acid was continuously added at 23.2 mL/hr. It was cooled after four hours when the polymerization conversion reached 60% to terminate the polymerization. Subsequently, unreacted vinyl acetate was removed under reduced pressure to obtain a methanol solution of polyvinyl acetate (PVAc). A methanol solution of NaOH (10% concentration) was added to a PVAc solution adjusted to 30% so as to make the alkali molar ratio (mole number of NaOH/mole number of vinyl ester unit in PVAc) to become 0.01 for saponification. The PVA thus obtained was washed with methanol. By way of the above operation, a PVA having terminal SH group was obtained that has a degree of polymerization of 400 and has a degree of saponification of 93 mol %. The sodium acetate content measured by isotachophoresis) was 0.5%. The modified PVA was dissolved in heavy water for nuclear magnetic resonance analysis, and the presence of an SH group at one terminal of the molecules was confirmed.

The thermal stability and the colorability were evaluated in the same way other than using the PVA having terminal SH group instead of the PVA used in Example 1. The results of evaluation are shown in Table 1.

Examples 11 through 14

They are examples of adding 0.5 parts by weight of glycerin monostearate, as a lubricant, based on 100 parts by weight of the vinyl chloride resin. It was mixed in the same way as Example 1 in a formula shown in Table 1, and the thermal stability and the colorability were evaluated. The results of evaluation are shown in Table 1.

Comparative Examples 1 through 4

In the same method as Example 1 other than modifying the weights of the vinyl acetate and methanol charged upon polymerization and modifying the alkali molar ratio for saponification, a PVA shown in Table 1 was obtained. The thermal stability and the colorability were evaluated in the same way as Example 1. The results of evaluation are shown in Table 1. Any of them were insufficient in the long term thermal stability. In Comparative Example 4, where the degree of saponification was as low as 70 mol %, it was colored in yellow.

Comparative Examples 5, 6

In the same method as Example 1 other than modifying the amount of the PVA blended therein relative to the polyvinyl chloride resin (PVC) as shown in Table 1, the thermal stability and the colorability were evaluated. The results of evaluation are shown in Table 1. It was colored in yellow in a case of too much PVA blended therein, and the long term thermal stability was insufficient in a case of too little PVA.

Comparative Example 7

In the same way as Example 1 other than not adding the PVA to the polyvinyl chloride resin, the thermal stability and the colorability were evaluated. The results of evaluation are shown in Table 1. The thermal stability was insufficient.

Comparative Examples 8, 9

In the same way as Example 1 other than modifying the amount of zinc stearate blended therein as shown in Table 1, the thermal stability and the colorability were evaluated. The results of evaluation are shown in Table 1. Any of them was insufficient in the thermal stability and the sheets were colored.

Comparative Examples 10 through 12

They are examples of adding 0.5 parts by weight of glycerin monostearate, as a lubricant, based on 100 parts by weight of the vinyl chloride resin. It was mixed in the same way as Example 1 in a formula shown in Table 1, and the thermal stability and the colorability were evaluated. The results of evaluation are shown in Table 1.

The invention claimed is:

1. A polyvinyl chloride resin composition comprising:
   a polyvinyl chloride resin;
   0.005 to 5 parts by weight of a vinyl alcohol-based polymer having a degree of saponification of 75 to 99.9 mol % and having a viscosity average degree of polymerization of 450 or less; and
   0.01 to 5 parts by weight of a zinc compound with respect to 100 parts by weight of the polyvinyl chloride resin.

2. The polyvinyl chloride resin composition according to claim 1, wherein the vinyl alcohol-based polymer is obtained by homopolymerizing a vinyl ester-based monomer.

3. The polyvinyl chloride resin composition according to claim 1, further comprising 0.001 to 10 parts by weight of a lubricant with respect to 100 parts by weight of the polyvinyl chloride resin.

4. The polyvinyl chloride resin composition according to claim 3, wherein the lubricant is a fatty acid ester of polyol.

5. The polyvinyl chloride resin composition according to claim 4, wherein the fatty acid ester of polyol is glycerin monostearate.

6. A method of producing a polyvinyl chloride resin composition, the method comprising:

TABLE 1

| | Evaluation Conditions and Results | | | | | | |
|---|---|---|---|---|---|---|---|
| | PVA | | Zinc | | Glycerin | | |
| | Degree of Polymerization | Degree of Saponification (mol %) | Compound*1 (parts/PVC 100 parts) | PVA (parts/PVC 100 parts) | Monostearate (parts/PVC 100 parts) | Time Period to be Blackened (min) | Colorability |
| Example 1 | 400 | 93 | 2 | 1 | 0 | 180 | A |
| Example 2 | 400 | 98.5 | 2 | 1 | 0 | 140 | A |
| Example 3 | 400 | 78 | 2 | 1 | 0 | 140 | A |
| Example 4 | 400 | 75 | 2 | 1 | 0 | 135 | B |
| Example 5 | 430 | 93 | 2 | 1 | 0 | 150 | A |
| Example 6 | 450 | 93 | 2 | 1 | 0 | 130 | A |
| Example 7 | 290 | 88 | 2 | 1 | 0 | 185 | A |
| Example 8 | 400 | 93 | 2 | 1*2 | 0 | 190 | A |
| Example 9 | 400 | 93 | 2 | 1*3 | 0 | 195 | B |
| Example 10 | 400 | 93 | 2 | 1*4 | 0 | 120 | C |
| Example 11 | 400 | 93 | 2 | 1 | 0.5 | 190 | A |
| Example 12 | 400 | 98.5 | 2 | 1 | 0.5 | 160 | A |
| Example 13 | 400 | 78 | 2 | 1 | 0.5 | 160 | A |
| Example 14 | 400 | 75 | 2 | 1 | 0.5 | 150 | A |
| Comparative Example 1 | 500 | 98.5 | 2 | 1 | 0 | 70 | B |
| Comparative Example 2 | 500 | 88 | 2 | 1 | 0 | 90 | B |
| Comparative Example 3 | 500 | 73.5 | 2 | 1 | 0 | 80 | B |
| Comparative Example 4 | 400 | 70 | 2 | 1 | 0 | 90 | C |
| Comparative Example 5 | 400 | 93 | 2 | 0.001 | 0 | 60 | A |
| Comparative Example 6 | 400 | 93 | 2 | 10 | 0 | 180 | D |
| Comparative Example 7 | — | — | 2 | 0 | 0 | 60 | A |
| Comparative Example 8 | 400 | 93 | 0.002 | 1 | 0 | 50 | D |
| Comparative Example 9 | 400 | 93 | 15 | 1 | 0 | 60 | D |
| Comparative Example 10 | 500 | 98.5 | 2 | 1 | 0.5 | 90 | B |
| Comparative Example 11 | 500 | 88 | 2 | 1 | 0.5 | 100 | B |
| Comparative Example 12 | 500 | 73.5 | 2 | 1 | 0.5 | 90 | B |

*1 Zinc Stearate
*2 Added to make Sodium Acetate Content to be 2 parts by weight based on 100 parts of PVA
*3 Added to make Sodium Acetate Content to be 5 parts by weight based on 100 parts of PVA
*4 PVA having terminal SH group adding 0.005 to 5 parts by weight of a vinyl alcohol-based polymer having a degree of saponification of 75 to 99.9 mol % and having a viscosity average degree of polymerization of 450 or less and 0.01 to 5 parts by weight of a zinc compound with respect to 100 parts by weight of a polyvinyl chloride resin to a polyvinyl chloride resin.

7. The method of producing a polyvinyl chloride resin composition according to claim 6, further comprising adding 0.001 to 10 parts by weight of a lubricant with respect to 100 parts by weight of the polyvinyl chloride resin.

8. The polyvinyl chloride resin composition according to claim 1, wherein said vinyl alcohol-based polymer has a degree of saponification of 78 to 98.5 mol. %.

9. The polyvinyl chloride resin composition according to claim 1, wherein said vinyl alcohol-based polymer has a degree of saponification of 80 to 96 mol. %.

10. The polyvinyl chloride resin composition according to claim 1, wherein said vinyl alcohol-based polymer has a degree of polymerization of 430 or less.

11. The polyvinyl chloride resin composition according to claim 1, wherein said vinyl alcohol-based polymer has a degree of polymerization of 410 or less.

12. The polyvinyl chloride resin composition according to claim 1, wherein said zinc compound is at least one compound selected from the group consisting of zinc stearate, zinc laurate, zinc oleate, zinc benzoate, zinc p-tert butyl benzoate, an amino acid zinc salt, a phosphate zinc salt, zinc oxide and zinc carbonate.

13. The polyvinyl chloride resin composition according to claim 1, wherein said zinc compound is present in an amount of 0.05 to 3 parts by weight.

14. The polyvinyl chloride resin composition according to claim 1, wherein said polyvinyl chloride resin is produced from monomers comprising 50 wt. % or more of vinyl chloride monomer.

15. The polyvinyl chloride resin composition according to claim 1, wherein said polyvinyl chloride resin is produced from monomers comprising at least one monomer selected from the group consisting of a vinyl ester, an acrylic ester, a methacrylic ester, an olefin, maleic anhydride, acrylonitrile, styrene and vinylidene chloride.

16. The polyvinyl chloride resin composition according to claim 1, wherein said vinyl alcohol-based polymer is present in an amount of 0.04 to 3 parts by weight.

17. The polyvinyl chloride resin composition according to claim 1, wherein said vinyl alcohol-based polymer comprises an acid having a pKa at 25° C. of from 3.5 to 5.5 and/or a metal salt thereof.

18. The polyvinyl chloride resin composition according to claim 17, wherein said acid having a pKa of from 3.5 to 5.5 and/or a metal salt thereof is contained in a ratio of 0.05 to 5 parts by weight based on 100 parts by weight of said vinyl alcohol-based polymer.

* * * * *